# United States Patent Office 2,882,247
Patented Apr. 14, 1959

2,882,247

ION EXCHANGING MEMBRANES FROM TRI-METHYLOL FORMING ARYL ETHERS

Karl Haagen, Leverkusen-Bayerwerk, and Friedrich Helfferich, Gottingen, Germany, assignors to Farbenfabriken Bayer Aktiengesellschaft, Leverkusen, Germany, a corporation of Germany No Drawing. Application February 15, 1955
Serial No. 488,411

Claims priority, application Germany February 18, 1954

2 Claims. (Cl. 260—2.1)

This invention relates to ion exchanging membranes. It has been found that ion exchanging resins which contain besides the ion exchanging groups etherified aromatic hydroxy groups are particularly suitable for the production of membranes. These exchanger membranes are characterized by a high mechanical stability as compared with the prior known membranes more especially those from the exchanger resins which contain free phenolic hydroxyl groups.

For the production of the exchanger membranes according to the invention, there are more particularly employed the high-molecular condensation products from ethers of aromatic hydroxy compounds with aldehydes, preferably with formaldehyde, the said ethers containing ion exchanging groups, such as sulphonic acid groups and/or carboxylic acid groups or amino groups preferably alkylated quaternized amino groups. The said condensation products are more particularly those which are described in German patent specifications 829,498 and 898,080 and also those described in French Patents 1,071,917 and 1,080,189.

The membranes may be obtained in a simple manner if the still liquid ether-formaldehyde reaction mixtures as produced by the above processes are cast on to a suitable support, for example a glass plate, covered with a second plate and the solution between the two plates is condensed to form a gel by uniform heating. By varying the spacing of the two plates from one another, it is possible to produce membranes of different thicknesses. If the casting solution is thinly liquid, it is expedient to use a dish which has a flat bottom and which may be covered. An especially uniform surface is obtained if the liquid reaction mixture is cast on to mercury which is located in a container which is adapted to be covered. Moreover, with rapidly proceeding exothermal reactions, such as sometimes occur with condensation temperatures in the region of 90° C., the good thermal conductivity of said container prevents relatively strong rises in temperature, which in certain circumstances result in the formation of small bubbles in the membrane.

In general, the cross-linking of the ion exchanging resins in the production of the membrane is not carried out so extensively as with the manufacture of exchangers in granule or bead form, since the elasticity of the product of condensation decreases and the brittleness increases as the cross-linking increases, so that the membranes become more fragile. If the cross-linking is too low, on the other hand, the membranes swell very considerably in water, whereby they also become very fragile and have a tendency to peptisation.

In many cases, the stability of the membrane may be improved by a supporting frame of inactive material being incorporated during condensation. As the carrier or support of the membrane, it is, for example, possible to use a coarse mesh fabric of a plastic which is resistant to elevated temperature and acid (for example polyvinyl chloride or polyvinylidene chloride) or a perforated plastic foil which is resistant to the condensation conditions. The fabric or the foil is embedded in the resin solution which is cast on to a flat support and a cover plate is placed thereon in such manner that there are no air bubbles between the plates. If the casting solution is very viscous, so that gas bubbles only escape slowly, the said solution is expediently placed under vacuum before the processing.

With the production of the diaphragm, it is also possible to proceed in such manner that the casting solution is applied with a brush to the support or to the fabric, the thin film which is obtained is briefly dried and again coated with the casting solution. This operation may, if necessary, be repeated several times. If the condensation mixture is thinly liquid, it may also be sprayed through a nozzle against a suitable surface, which has no affinity for the exchanger gel being formed, or it may be sprayed on to a fabric which is to serve as membrane support.

The finished membrane is placed in water for removing the acid used as catalyst. In many cases, it is advisable for the membrane to be initially moistened by a saturated salt solution or by an organic solvent miscible with water and for these to be gradually removed by water.

Example 1

252 g. of anisol are mixed at room temperature and while stirring with a mixture of 230 g. of concentrated sulphuric acid and 30 g. of oleum (65% $SO_3$). The temperature rises and a clear solution is formed which is heated for 2 hours in an oil bath to 100–125° C. (bath temperature). 314 g. of the sulphonation product which is obtained are mixed with 40 ml. of $H_2O$ and the solution is cooled to 20° C. While cooling and stirring, 200 g. of 35% formalin are allowed to flow in, first of all slowly and then more quickly. The reaction mixture is cast on to a flat support and condensed in a covered dish for 2–3 hours at 90° C. The reddish-white to yellowish-white membrane is then lifted from the support and may be placed in water after cooling for a short time. It is characterized by high compressive strength. No fissures are formed with different degrees of swelling. In particular, it does not tear if the margins of the membrane dry out owing to being stretched for a relatively long time in technical apparatus. It may be stored and dispatched in an air-dry condition. Because of these valuable properties, the membrane made from anisol is superior to a membrane obtained in similar manner from phenol. The capacity is about 1.6 milli-equivalents per gram of dry hydrogen form of the membrane thus produced.

Example 2

223 g. of phenoxy-acetic acid (moist 81.8%) are introduced into a solution of 100 g. of 100% sulphuric acid in 40 ml. of water and dissolved by heating to 95–100° C. 255 g. of the sodium salt of 2.4-benzaldehyde disulphonic acid (moist 59%) calculated with the molecular weight of 266, are then added at the same temperature while stirring. The temperature is now raised to 105–110° C. and maintained at this temperature until the benzaldehyde disulphonic acid is consumed. The condensation product is present as a clear, viscous solution which is deep cherry-red in color. It is allowed to cool slightly and then 215 g. of 40% formalin solution and also 520 g. of 81.8% phenoxy-acetic acid are added, the mixture then being heated to about 80° C. Without supplying heat, the temperature rises to 106° C., boiling taking place under reflux. After the temperature has dropped to about 100° C., 90 g. of paraformaldehyde are added all at once. The temperature is now kept at 95° C. until a viscous solution has formed. This solution is cast on to glass plates and heated in an oven to 90° C. after being covered with a second plate. A reddish transparent membrane is obtained which contains sulpho groups and carboxyl groups in the ratio of 1:4. With the transformation of the hydrogen form of the exchanger into the sodium form, the swelling of the membrane increases considerably. At the same time, however, the strength properties thereof are deleteriously affected thereby. If it is desired to use the membrane in the sodium form, the procedure is in accordance with our French Patent 1,071,917 and a compound is concurrently condensed in the exchanger molecule, which compound does not contain any exchange-active atom group, but is polyfunctional as regards its reactivity with respect to aldehydes.

In the present example, therefore, with addition of 215 g. of formalin solution and 520 g. of phenoxy-acetic acid, 200 g. of diphenyl ether or naphthalene would be further added and the amount of paraformaldehyde increased to 220 g. If the procedure in other respects is as indicated above, there is obtained an exchanger membrane which is also stable in the sodium form.

*Example 3*

650 g. of phenoxy-ethyl trimethyl ammonium chloride $C_6H_5OCH_2CH_2N(CH_3)_3Cl$, which has been obtained by reacting phenoxy-ethyl chloride with trimethylamine, are heated together with 255 g. of diphenyl ether, 350 g. of paraformaldehyde and 730 g. of 70% sulphuric acid to 60–70° C. while stirring. The temperature rises without further supply of heat to 109° C. and is maintained at this temperature for about 15 minutes, boiling under reflux taking place. The viscous condensation product obtained in this manner is cast on to glass plates. A coarse meshed fabric of polyvinyl chloride is then placed thereon and pressed into the solution. Heating takes place for about 16 hours to 90° C. and there is obtained a light slightly cloudy anion-exchanger membrane, which contains quaternary nitrogen atoms in bonded form. It has better membrane properties than, for example, foils which are obtained by condensation of amines with epichlorhydrin.

*Example 4*

783 g. of phenoxy-ethyl chloride $C_6H_5OCH_2CH_2.Cl$ are condensed with 600 g. of a mixture comprising polyethylene-polyamine bases with a boiling point of 150–200° C., by allowing the former to flow in the course of 30 minutes and while stirring into the base, which is heated to 100° C. The temperature rises to 120–130° C. and is maintained for a further hour at 130° C. upon completing the running-in. 250 g. of ethylene chloride are now slowly added dropwise and the mixture is boiled under reflux while stirring until the temperature of the reaction product has risen to 160° C. The ethylene chloride effects the formation of ethylene bridges between nitrogen atoms and thus an enlargement of molecule. The viscous solution is allowed to cool, 525 g. of 50% sulphuric acid, 250 g. of aqueous formalin solution (30%), 375 g. of paraformaldehyde and 125 g. of diphenyl ether are added and the mixture is heated to about 100° C. until the paraformaldehyde has completely dissolved. The mixture is thereafter cooled to 60–70° C. and stirred well with 600 g. of 70% sulphuric acid. An anion-exchanger membrane is produced according to the process described in Example 3 from the viscous solution which is thus obtained. The said membrane contains tertiary nitrogen atoms and is just as stable as that produced according to Example 3.

*Example 5*

182 g. of phenoxy-acetic acid (moist 83.4%), together with 120 g. of p-toluene sulphonic acid (about 89%) and 50 g. of diphenyl ether are dissolved in 150 g. of 40% formalin by heating while stirring. The solution is boiled for about 10–15 minutes under reflux, is then mixed with 40 g. of paraformaldehyde and maintained for a further 10–20 minutes at 95–100° C. The viscous clear solution is cast on to glass plates and, after being covered with a second plate, is heated for about 16 hours at 90° C. A slightly cloudy, practically colorless, elastic membrane is obtained, which contains only carboxyl groups as exchange-active groups.

What we claim is:

1. A process for producing a resinous ion-exchange membrane which comprises reacting with formaldehyde a trimethylol forming aryleter selected from the group consisting of diaryl ethers containing a sulfonic acid group and an alkylaryl ether, the alkyl group of which contain an ion-exchanging group selected from the group consisting of carboxyl and amino groups, in the presence of water, casting liquid reaction mixture on a support, covering said liquid reaction mixture, and heating to form an insoluble product.

2. A process according to claim 1 wherein the alkylarylethers contained quaternized amino groups.

References Cited in the file of this patent

UNITED STATES PATENTS

| | | |
|---|---|---|
| 2,636,851 | Juda et al. | Apr. 28, 1953 |
| 2,692,866 | Haagen | Oct. 26, 1954 |
| 2,756,202 | Clarke | July 24, 1956 |

FOREIGN PATENTS

| | | |
|---|---|---|
| 898,080 | Germany | Nov. 26, 1953 |
| 1,071,917 | France | Mar. 10, 1954 |